Figure 1:
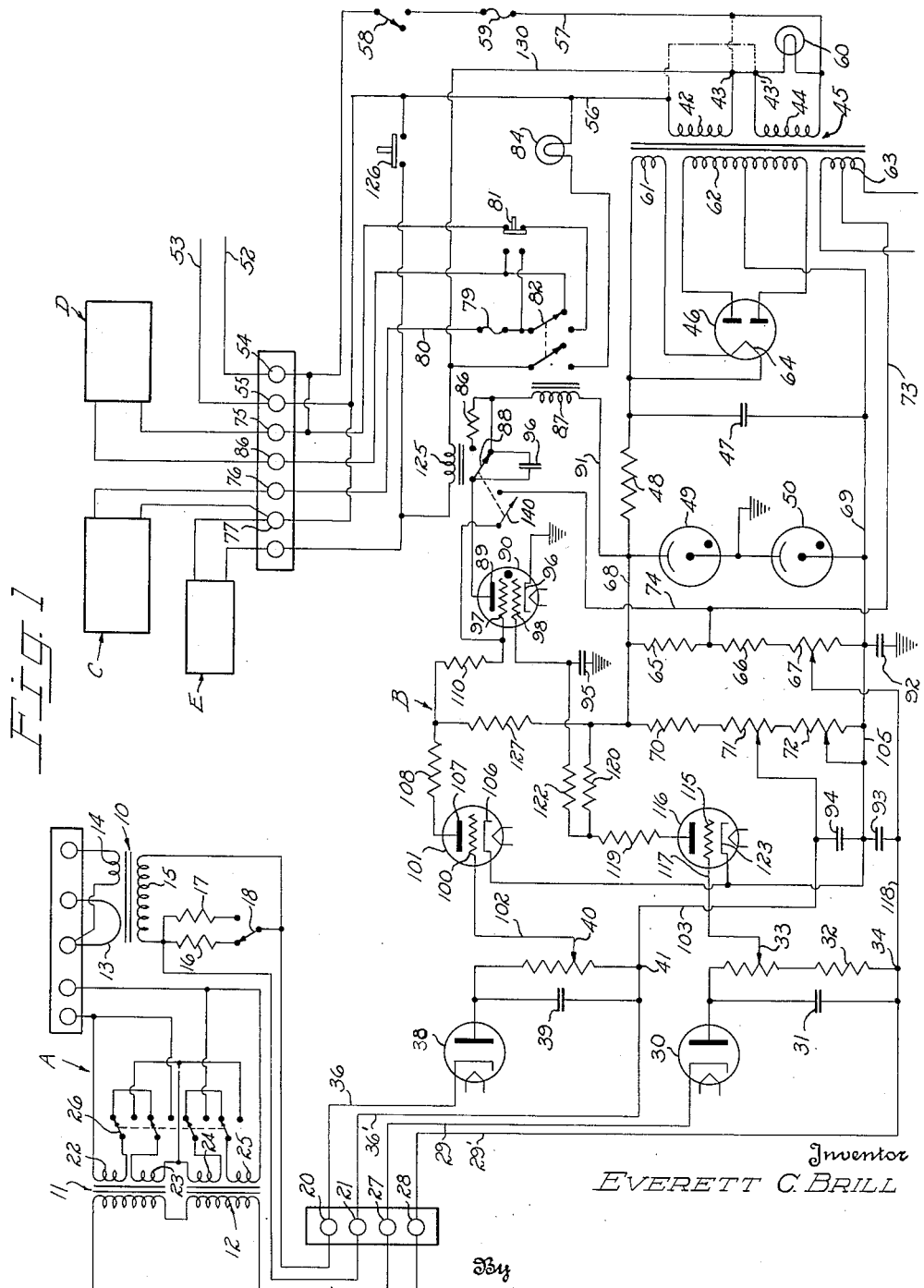

Dec. 5, 1950  E. C. BRILL  2,532,285
PROTECTIVE DEVICE
Filed July 8, 1949  2 Sheets-Sheet 1

Inventor
EVERETT C. BRILL
By
Lindsey, Prutzman & Just
Attorneys

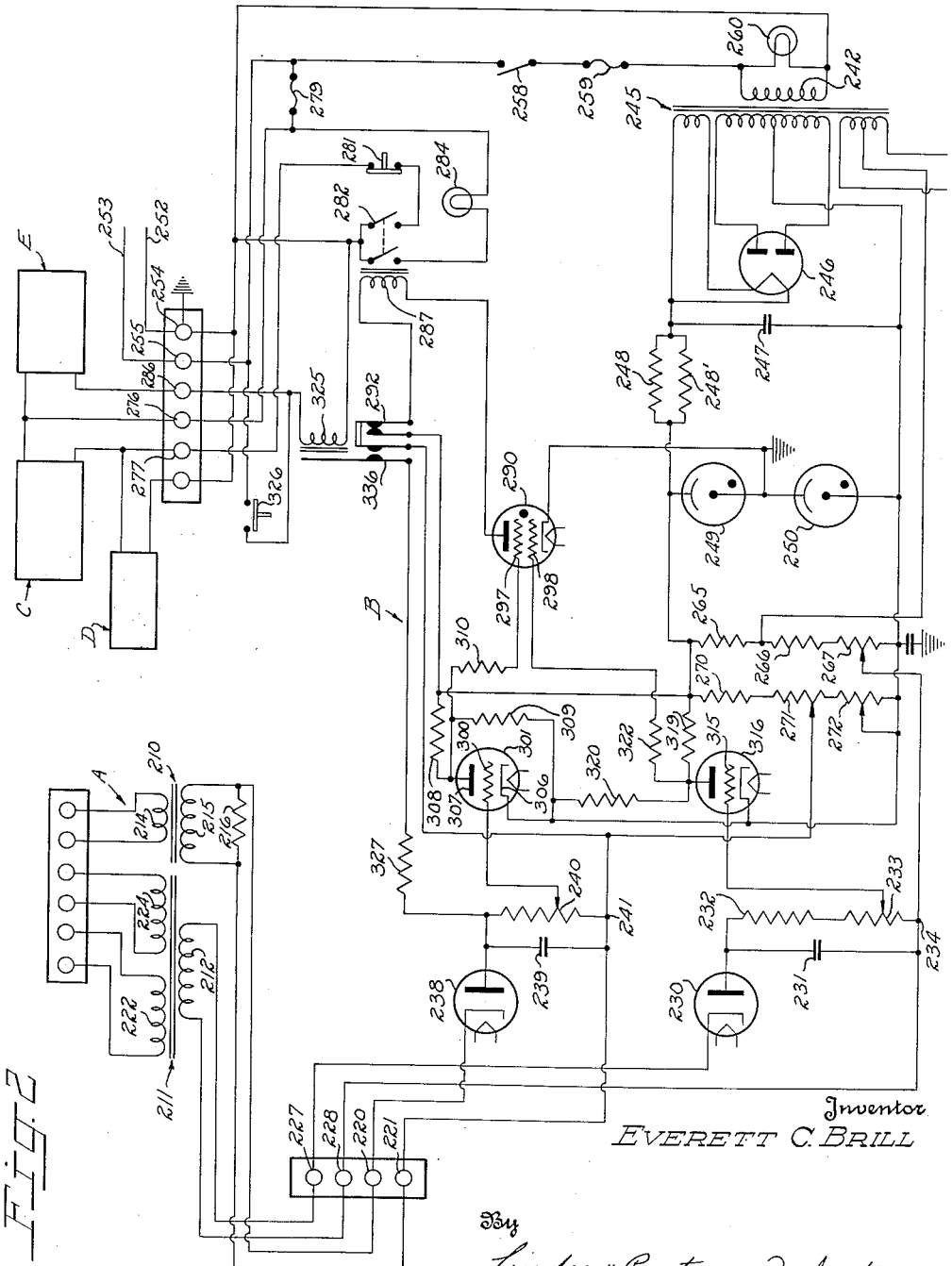

Patented Dec. 5, 1950

2,532,285

UNITED STATES PATENT OFFICE 2,532,285

PROTECTIVE DEVICE

Everett C. Brill, Granby, Conn., assignor of one-half to James G. Schnell, Granby, Conn.

Application July 8, 1949, Serial No. 103,660

19 Claims. (Cl. 175—294)

This application is a continuation-in-part of my copending application Serial No. 414, filed January 3, 1948, now abandoned.

The present invention relates generally to electrical control means and, more particularly, to an electronic device responsive to variations in voltage and current inputs to an electrically operated means and adapted to function when the power consumption of such means as evidenced by said inputs departs from a predetermined value.

A particularly advantageous use of the device of the present invention is as a protective mechanism for use in connection with electrically operated machinery as, for example, to interrupt the operation of the machinery when the current and voltage input to the driving motor is indicative of overload conditions.

A principal object of the present invention is to provide a device which is responsive to both the voltage and current input to an electrically operated means and which will correlate these values so as to function the device when one of these values departs from a predetermined normal in relationship to the other value.

A more specific object of the invention is to provide a device which will derive a voltage component having a predetermined relationship to the current input of an electrically operated means and a second voltage component having a predetermined relationship to the voltage input of said means, and which will function as, for example, to energize a protective circuit, when said components depart from a relationship and value corresponding to a normal relationship and value of the said voltage and current inputs.

A more general object of the invention is to provide a device of the character described which will be sensitive in operation and variable in adjustment to meet the requirements of various installations, and a device which when set will be foolproof in operation and will perform satisfactorily over long periods of time without repair or adjustment.

Other objects will be in part obvious and in part pointed out more in detail hereinafter.

In general, a device embodying my invention is one which will energize or otherwise initiate the operation of any auxiliary means provided, which may be a protective circuit and/or visual or audible signaling or indicating devices, or any other similar means desired, when the power consumption of a given electrically powered instrumentality exceeds a predetermined normal. The device is one which combines means for developing voltage components responsive to line voltage and current, respectively, and means responsive to such developed voltage components for energizing or otherwise actuating the auxiliary means. A salient feature of the device is the development of voltage components responsive to line voltage and current, respectively, which voltage components will vary with respect to each other in relationship which is different from that existing between the line voltage and line current to which they are responsive. This new relationship permits sensitive and accurate functioning of the means responsive to the developed voltage components, whereby even very slight deviations from normal line current and voltage may be detected.

As mentioned above, a principal use, for example, to which the device of the present invention is particularly adapted, is in the protection of machinery driven by electric motors from operation under overload conditions which might damage the apparatus being driven. In such a use, the device is connected to the power lines going to the motor and is preferably arranged to protect the apparatus from damage by interrupting its operation such as by disconnecting the motor from the line, disengaging a clutch in the drive between the motor and apparatus, or applying a brake, etc., or any combination of these. It is desired that the operation of the device shall occur immediately and accurately when the overload condition reaches a predetermined value for which the device has been set.

In such an installation, the power input to the electric motor is a function of the load on that motor and, therefore, the power input can be utilized as an indication and measurement of motor load conditions. For example, if the installation in which the electric motor is utilized is such that under normal operating conditions there results a given power consumption by the electric motor, then it is very likely that there is an overload on the apparatus being driven by the electric motor upon any material increase over that given power consumption.

The power input to the motor is, of course, a direct function of the voltage and the current inputs to the motor. If the volage input to the motor were to remain constant, such as where there would be a non-fluctuating line voltage, then a satisfactory protective device could be made to function in response to current changes only since the amount of current input would then be directly indicative of the load conditions. However, a constant line voltage is practically never encountered in commercial installations. In actual practice, some line voltage variations always occur and in some cases they may range as high as ±20%.

Assuming that the motor is operated under constant load conditions but under fluctuating line voltage conditions, there will then result fluctuations in the line current sufficient to keep the power input substantially constant. However, the changes in line current to provide a constant power input under fluctuating voltage conditions will not bear a straight line relationship to the voltage variations. As will be readily apparent, the change in line current will be inversely in proportion to the changes in line voltage in accordance with the formula $$E = \frac{P}{I}$$

This means, for example, that a 25% drop in line voltage will result in a 33⅓% increase in current, a 50% drop in line voltage will result in a 100% increase in current, etc. In other words, under constant load conditions, a plot of current against voltage is non-linear and in the form of a hyperbolic curve.

To further complicate the matter, the motor efficiency will vary over a wide range depending on the input voltage. In general and assuming a constant load, motor efficiency will be greater when the power input is obtained by an increased voltage and decreased current than when the power input is obtained by a decreased voltage and increased current. For very sensitive operations, these variations in motor efficiency must also be taken into consideration. The plotted curve showing the "normal" relationship of current and voltage, with or without correction to take into account the efficiency deviations just mentioned, will be referred to herein as the "performance curve" for the motor or other device to be protected.

There are available various protective devices which can be made to function in response to line current and line voltage or a plurality of voltage components related to said current and voltages. However, all of such instrumentalities are responsive to the arithmetic sum of these components or at least a combination thereof which does not reflect the hyperbolic relationship actually existing between line voltage and line current going to an electrically operated device such as an electric motor which is operated under constant load. Accordingly, when such instrumentalities are utilized, they normally will be set for such great changes in power input that they will lack the necessary sensitivity for immediately detecting an overload condition and initiating the protection of the motor. On the other hand, if they are not set for such broad variations, they will tend to function at times when there actually is no overload condition.

In accordance with the present invention, I have discovered that the disadvantages of the prior art of protective devices may be overcome and there may be produced a protective device having very surprising selectivity and other desirable operating characteristics by developing two voltage components in response to line current and line voltage respectively, which voltage components are modified at the initiation or thereafter so that they vary in a relationship which is different from that between the line current and line voltage, and in a relationship which can cause accurate and sensitive functioning of the protective device.

The principle underlying the present invention, therefore, is to develop voltage components for operating the protective device which are responsive to line voltage and line current, respectively, but which are not in the usual direct ratio thereto. The actual relationship desired is one corresponding to the hyperbolic performance curve heretofore referred to. By way of more specific example, and to assist in the understanding of the invention, it usually is desired to cover line voltage variations between 75% and 115% of normal; i. e., between 165 and 253 volts for a rated voltage of 220, and between the 330 and 506 volts for a rated voltage of 440. To provide the desired non-linear relationship between the line voltage and the developed voltage component responsive thereto, the developed voltage must increase at a decreasing rate as the line voltage is increased from the lower to the upper limit. Taking the change of line voltage from 165 to 253 (88 volts) as 100%, the change from 165 to 220 volts is then 62.5% of the total. In a conventional straight line relationship between line voltage and the developed voltage component responsive thereto, the voltage component would also increase 62.5% of its total change. However, in order to obtain a hyperbolic curve relationship between the voltage component and line voltage suitable for most installations, for example, the developed voltage component should increase to 71.875% of its total change, when the line voltage varies only 62.5% of its total change. Then when the line voltage increases for the remaining 37.5% of its total change, the developed voltage will increase only 28.125% of its total change.

Once the above principle is appreciated, various instrumentalities may be designed by one skilled in the art to accomplish the result desired. However, in order to disclose the best manner of practicing the invention but without desiring to be limited specifically thereto, I have set forth in the drawings and in the description thereafter two preferred ways of constructing a device embodying the invention.

Referring to the drawings:

Fig. 1 is a wiring diagram of a protective device embodying the present invention which is adapted to be connected into the power input line of an electric motor and to energize a protective circuit for removing the motor from the line and/or otherwise to protect the apparatus driven by the motor when the current and voltage in the lines indicate that the apparatus is being operated under overload conditions. In this specific embodiment, the development of a voltage component which does not bear a straight line relationship to line voltage is accomplished in the transformer stage of the device.

Fig. 2 is a wiring diagram of a similar protective device wherein the development of a voltage component which is not in straight line relationship to line voltage is accomplished in the amplification stage.

Referring to the drawings, and particularly to Fig. 1 thereof, the specific embodiment of the device of the present invention is illustrated as consisting of two separate units A and B. The unit A is preferably located adjacent the drive motor (not shown) so that leads from the motor starter to the motor can be conveniently connected thereto. The unit B may be mounted in any other convenient location preferably away from any excessive vibration, splashing oil, dirt, etc. An auxiliary control is adapted to be utilized for protecting the apparatus driven by the motor by such expedients as disengaging the motor from the line, actuating a disengaging clutch between the motor and the driven apparatus, or by reversing the motor, or applying a brake, etc., or any combination of such expedients. The actual mechanism of the auxiliary control will be readily understood by one skilled in the art and does not in itself form a part of the present invention; accordingly, it has been shown merely diagrammatically at C.

The unit A comprises a transformer 10 for developing a secondary voltage responsive to line current and a pair of transformers 11 and 12 connected in series for developing a secondary voltage responsive to line voltage. In the commercial embodiment of the invention illustrated in the drawings, for example, the transformers 11 and 12 may be utilized with a line rated at either 220 or 440 volts and transformer 10 with line currents ranging as high as 100 amps. It will be noted that the transformer 10 is provided with two primary windings 13 and 14. The primary winding 14 is adapted to be connected in one of the power lines when the line current is in a lower range, for example, of 0 to 10 amps. while the primary winding 13 is adapted to be connected in the line when the line current varies within a higher range, for example, from 10 to 100 amps.

The secondary 15 of transformer 10 may be connected across either resistor 16 or resistor 17 depending upon the setting of switch 18. The particular resistor selected is one which will cause a voltage drop of suitable magnitude depending upon the average line current and the primary winding utilized. Terminals 20 and 21 are also connected across the resistor 16 or 17 by switch 18 so that the voltage developed across the particular resistor selected will appear at terminals 20 and 21. As will be well understood by one skilled in the art, the voltage component appearing at terminals 20 and 21 will be in straight line relationship to the magnitude of line current.

The transformer 11 is provided with a split primary denoted at 22 and 23, and transformer 12 is provided with a split primary denoted at 24 and 25. The primaries are arranged for connection in series across the power lines going to the motor (not shown). The primary sections 22 and 23 and primary sections 24 and 25 are themselves connected in series or parallel depending upon the position of the multiple pole, double throw switch 26. In the position of the switch 26 shown in the drawing, the primary sections are in series. As will be apparent, the setting of switch 26 as shown in the drawings is utilized for a higher line voltage such as in a conventional 440 volt installation, for example, whereas the other setting of switch 26 would be utilized for one half that line voltage such as a 220 volt installation in the specific example.

The secondaries of transformers 11 and 12 are connected in series but in opposition to each other across terminals 27 and 28. The transformer 11 is constructed with a greater number of turns in its primary than in its secondary and, therefore, is a normal step-down transformer. The transformer 12 conversely has a smaller number of turns in its primary and a greater number of turns in its secondary, the transformer 12 being a step-up transformer. The desideratum here is to obtain a combined secondary voltage which will vary in proportion to line voltage in accordance with the hyperbolic performance curve mentioned above. The transformers 11 and 12 can be readily designed to accomplish this result. For example, but without intending to limit the scope of the invention thereto, I have found that satisfactory results can be obtained in most installations by constructing the transformer 11 with a split primary, each section of which is wound with 3200 turns, and a secondary having 600 turns, and by constructing transformer 12 with a split primary, each section of which consists of 250 turns and with a secondary consisting of 1675 turns.

While it is not desired to be limited to any particular theory of operation, the following explanation is offered of the operation of transformers 11 and 12 in order to clarify the understanding of this embodiment of the invention. The impedance of the primary of transformer 11 is much greater than the impedance of the primary of transformer 12, which has fewer turns, so that it, principally, will control the amount of primary current of the transformers. This current will be a low value with no load or a very light secondary load. Since transformer 12 has a small number of primary turns, the flux produced by the small number of ampere-turns will be small and consequently the voltage across the secondary will be small even though this transformer has a step-up ratio.

The characteristics of electrical steel are such that at very low values of ampere-turns, a given increase in ampere-turns will produce a smaller increase in flux than the same increase in ampere-turns at higher values. In other words, the curve of ampere-turns vs. flux gradually increases in slope until a substantially linear slope exists. As ampere-turns are further increased, the curve finally becomes or approaches the horizontal due to saturation of the iron. As a result, transformer 11 in this case operates normally in the straight line portion of the curve while transformer 12 operates in the lower portion.

As the current in the primary of the transformer 12 increases then the flux produced by it will increase at an increasing rate. The secondary voltage will also increase in the same manner. At the same time, the phase angle between primary voltage and current also varies. This is true to a much greater extent in the case of transformer 12 as compared with transformer 11. At low values of ampere-turns, the inphase component of current which supplies the $I^2$ loss due to the ohmic resistance of the winding and the iron (hysteresis and eddy current) losses is small. The quadrant component which produces the flux, however, is also small. As the primary current is increased, the inphase component increases but the quadrant component increases to a much greater degree. Therefore, there is a vast difference between the primary voltage as well as the secondary voltage of the two transformers. The two transformers being connected in opposition, it will be realized that the secondary voltage of the combination increases at a decreasing rate as the primary voltage is increased over the working range.

Accordingly, by proper design of the transformers 11 and 12, it is possible to obtain a desired hyperbolic relationship between the developed voltage component appearing across terminals 27 and 28 and the line voltage. The variables are the amount and type of iron utilized in both transformers, the relationship between primary and secondary turns and wire size of both transformers, the relationship between the two primaries as to turns and wire size, the relationship between two secondaries as to turns and wire size, and the load across the secondary of the transformers.

While the foregoing embodiment utilizing the transformers 11 and 12 constructed as described above is believed to be the best arrangement for obtaining the desired hyperbolic relationship between the developed secondary voltage and the line voltage in the transformer stage, other methods of obtaining this same relationship at this stage are equally feasible and would be readily apparent to one skilled in the art. For example, it is possible by proper selection of a core material, such as nickel, iron, or the like, to design a transformer which will reach magnetic saturation at a rate comparable to the desired secondary voltage curve. It also is possible to obtain similar results by the use of suitably designed magnetic shunts. For example, it is possible to provide a shunt for by-passing a portion of the flux around the secondary winding at an increasing rate as the flux produced by the primary is increased (by increasing primary voltage). Also, magnetic shunts may be designed to cause magnetic saturation in the secondary portion of the iron as the flux is increased. It is also feasible to utilize shorted or other auxiliary windings to cause either magnetic saturation or to set up an opposing flux. Regardless of the exact method utilized, the purpose in this embodiment of the invention is to obtain a secondary voltage having the desired hyperbolic relationship to line voltage.

Terminals 27 and 28 are connected by lines 29 and 29' to a conventional filtered half-wave rectifier circuit comprising the diode 30, filter capacitor 31, resistor 32 and potentiometer 33. As a result, an adjustable unidirectional voltage directly proportional to the combined secondary voltage of transformers 11 and 12 is obtained between terminal 34 and the adjustable contact of potentiometer 33. Resistor 32 is utilized merely to permit a less critical adjustment of potentiometer 33.

Terminals 29 and 21 are connected by lines 36 and 36' to a second conventional filtered half-wave rectifier circuit comprising diode 38, filter capacitor 39 and potentiometer 40. As a result, an adjustable unidirectional voltage directly proportional to line current and varying in straight line relationship therewith is obtained between terminal 41 and the adjustable contact of potentiometer 40.

For operation of the unit B, there is provided a conventional D.-C. power supply circuit; namely, a voltage-regulated filtered full-wave rectifier circuit comprising the power transformer 45, twin-diode 46, filter capacitor 47, resistor 48 and glow-tube voltage regulators 49 and 50.

The split primary of power transformer 45 consisting of sections 42 and 44 is adapted to be connected with its sections in series or in parallel across a conventional 60 cycle power supply. Such a power source is indicated by the lines 52 and 53 connected to terminals 54 and 55, respectively. When the power source is an ordinary 230 volt supply, the primary sections will be connected in series as shown in solid lines in the drawing. If the supply is a conventional 115 volt source, the primary sections will be connected in parallel as shown in dotted lines, in which case the connection between terminals 43 and 43' is omitted. Line 56 connects one side of the primary section 42 to terminal 55 while line 57 connects the opposite side of the primary section 44 to the terminal 54 through switch 58 and protective fuse 59. An indicator lamp 60 is connected across one of the primary sections, such as section 44, to show when the unit is turned on by switch 58.

Secondary winding 61 is utilized to supply the power for the filament 64 of rectifier 46. Secondary winding 62 is the main winding for producing a 300 volt supply for use in operating the unit. Secondary winding 63 supplies the power for the filaments of the remaining tubes in the circuits.

A voltage divider circuit comprising resistors 65 and 66, and potentiometer 67 is connected across the 300 volt lines 68 and 69 of the rectified power supply and in parallel with a second voltage divider circuit comprising resistor 70 and potentiometers 71 and 72. These voltage divider circuits provide biasing potentials for use as hereinafter explained. Line 73 is provided to maintain allowable potential differences between cathode and filament of all tubes supplied by the secondary winding 63.

The auxiliary electrical control C, which has been previously described, is connected to the terminals 76 and 77. Terminal 77 is connected to the terminal 55 and hence to the power source line 53. Terminal 76 is connected by line 80 through protective fuse 79 to a double throw, double-pole switch 82 which normally is in the position shown in the drawing thereby normally connecting line 80 to terminal 86. When switch 82 is thrown to its other position, line 80 is connected through normally closed push button switch 84 to terminal 75 which in turn is connected to terminal 54 which is connected to power supply line 52. Accordingly, when the switch 82 is moved to the other position from that shown in the drawing, the auxiliary control C will be connected directly across lines 52 and 53 and thus will be energized to perform its protective function such as stopping the motor, etc., as previously described.

The switch 82 is adapted to be operated by a solenoid 87 which is connected at one end through switch 88 to the plate 89 of a gas-filled tetrode or thyratron 90. The other side of the solenoid 87 is connected through line 91 to the positive side of the voltage regulated full-wave rectifier circuit previously described. Cathode 96 of thyratron 90 is connected to ground as is the midpoint of discharge tubes 49 and 50. Thus, it will be seen that the thyratron 90 is placed under a plate voltage of 150 volts and when this tube discharges, the solenoid 87 is energized to cause the closing of the switch 82, thereby initiating the operation of the auxiliary electrical control C.

The thyratron 90 has a conventional screen grid 97 and control grid 98. The screen grid 97 is adapted to be placed under a negative voltage while the control grid 98 is adapted to be placed under a positive voltage with respect to the cathode 96. Assuming that the plate voltage on the thyratron is sufficient to cause the tube to trigger, but that the grid voltages are adjusted so as to just prevent triggering, it will be apparent that the thyratron may be made to trip upon either a decrease in the negative voltage of the screen grid or an increase in the positive voltage of the control grid. On the other hand, a decrease in the negative voltage of the screen grid could be offset by a decrease in the positive voltage of the control grid or vice versa without tripping the thyratron. The relationship of screen grid voltage to control grid voltage which will just trip or cause the thyratron to discharge is linear. By way of specific example, but without intention to limit the invention thereby, it may be stated that in a commercial type of thyratron operating at a plate voltage of 150 volts, a control grid voltage of about 50 volts, and a screen grid voltage of about −17 volts, a screen grid voltage decrease of 1 volt can be offset by a decrease of approximately 4 volts in the control grid voltage so as to prevent the thyratron from discharging.

A portion of the negative voltage appearing across the potentiometer 40 (which varies linearly with respect to the line current) is impressed on the grid 100 of the triode 101, this connection being by line 102 extending to the adjustable contact of potentiometer 40. The terminal 41 is connected by line 103 to the movable contact of potentiometer 71. The movable contact of potentiometer 72 in turn is connected by line 105 to the cathode 106 of the triode 101. In this way, a positive bias taken from the potentiometers 71 and 72 is superimposed on the bias taken from the potentiometer 40. By suitably adjusting these three potentiometers, the bias on the grid 100 can be very closely regulated such that the grid bias will fall within the desired range and that fluctuation in grid bias will be of a desired magnitude. The plate current output of triode 101, when operated in the proper operating region, will vary linearly with respect to the current in the power lines going to the motor being protected.

The plate 107 of the triode 101 is connected through resistors 108 and 127 to the positive side of the rectified power circuit previously described. It thus will be understood that the triode 101 has an applied plate voltage of approximately 300 volts and the plate load resistance on this tube may be predetermined by the resistance of the resistors 108 and 127. Resistor 127 is connected to the screen grid 97 of the thyratron 90 through current limiting resistor 110. The circuit constants employed are such that the voltage drop across resistor 127 is greater than the voltage provided across glow discharge tube 50, thereby resulting in the desired negative voltage on screen grid 97. As will be apparent, an increase in line current in the power lines going to the motor of the apparatus being protected, will be accompanied by a proportionate increase in the negative grid bias on triode 109, thereby decreasing the plate current of triode 101 and causing screen grid bias of thyratron 90 to become less negative. This drop in the negative screen current bias of thyratron 90 is in straight line relationship to the increases in current input to the motor being protected.

As previously mentioned, the voltage across potentiometer 33 bears a desired hyperbolic relationship to changes in line voltage going to the protected motor. A portion of this voltage, namely, that between the adjustable contact of potentiometer 33 and terminal 34 is applied as a negative grid voltage to the grid 115 of the triode 116 through line 117. Line 118 extends from terminal 34 to the movable contact of potentiometer 67, thus superimposing a positive bias between the grid 115 and cathode 123. By proper setting of the potentiometers 67 and 33 a desired plate current output of triode 116 can readily be provided. It will be apparent that an increase in line voltage by increasing the negative bias will decrease the output of triode 116. As in the case of triode 101, the plate voltage on the triode 116 is the regulated 300 volts of the power supply previously referred to. Series resistors 119 and 120 determine the load on this triode 116 and thus determine its operating characteristics.

Resistor 120 is connected through current limiting resistor 122 to the control grid 98, the cathode 96 being connected to the midpoint between glow discharge tubes 49 and 50. In this case, the circuit is designed so that the voltage across resistor 120 is less than the voltage across glow tube 42 so that the resulting or combined bias on control grid 98 is positive. As a result, an increase in line voltage going to the motor of the apparatus to be protected will cause a decrease in the plate current output of triode 116 which in turn causes an increase in a positive direction of the control grid bias of the thyratron by reason of the decreased voltage drop across resistor 120.

The screen grid 97 is adapted to be connected by the normally open switch 140 to the midpoint of resistors 65 and 66. When the switch 140 is closed, it is assured that the thyratron will not trip, this by reason of the resulting increase in the negative screen grid voltage. Switch 140 is operated in unison with switch 88 by solenoid 125. Solenoid 125 is adapted to be operated either by a remote reset switch E or an adjacent normally open push button 126. As will be apparent, remote reset switch E and push button switch 126 are connected on one side to terminal 55 of power supply line 53 and on the other side to solenoid 125. The opposite side of solenoid 125 is connected to power through line 130 going to the primary of transformer 45. When either the remote reset switch E or the adjacent reset switch 126 are closed, thereby energizing solenoid 125, the switches 88 and 140 are moved to the other position from that shown in the drawing and places resistor 86 in the plate circuit of the thyratron. Resistor 86 is sufficiently large to insure that the thyratron will stop discharging thus de-energizing the solenoid 87, permitting the switch 82 to move to the position shown in the drawing, whereby the auxiliary control C is de-energized. Resistor 86 and capacitor 86 stabilize the voltage across glow tube 49. Capacitors 92, 93 and 94 may also be provided to overcome surges which might occur in the circuits. Capacitor 95 aids in resetting.

If it is desired to test the apparatus without energizing the auxiliary control C, this may be accomplished by depressing the normally closed push button 81 which opens the auxiliary control C circuit. If the device is operating properly, the throw of switch 82 will establish connection to the lamp 84, thus giving a visual indication that the thyratron has discharged. If desired an overload may be placed on the motor or machinery being protected by manual means or in any other convenient manner in order to test the sensitivity and proper functioning of the device.

In order to permit operation of the auxiliary control independently of the operation of the device of the present invention, if desired, there may be provided an auxiliary actuating mechanism shown diagrammatically at D which may be a simple switch connected across terminals 75 and 86. The auxiliary switch D is thereby connected in parallel with the switch 82 so that it may be used to operate the auxiliary control C while the switch 82 remains in the position shown in the drawing.

Referring to Fig. 2 of the drawings showing a second embodiment of the invention wherein the modification of the developed voltages is accomplished in the amplification stage, the device, in general, is very similar to that set forth in Fig. 1 described above. As in the case of the embodiment shown in Fig. 1, the device is constructed in two units A and B, the former for use adjacent the motor being protected, and the unit B for remote installation at any convenient place. As in the previous embodiment, the device is utilized to energize an auxiliary control mechanism denoted at C.

In the sub-unit A, there is provided a "current" transformer 210 having a primary 214 for connection in series with the motor being protected in one of the power lines going to the motor. The secondary 215 is connected across resistor 216. The voltage drop across resistor 216 appears at terminals 220 and 221. As in the case of the first embodiment, the voltage appearing at terminals 220 and 221 varies linearly and in direct proportion to the amount of current going to the motor being protected.

Transformer 211 is utilized to derive a secondary voltage responsive to the voltage on the lines going to the motor being protected. The transformer 211 is provided with two primary windings 222 and 224 for connection in series or parallel across the motor power lines. The primary windings 222 and 224 are connected in series for a high power line voltage, such as 440 volts, and are connected in parallel with the line voltage in half that amount, for example, 220 volts. The voltage induced in secondary 212 is impressed across terminals 227 and 228.

Contrary to the method utilized in the first embodiment of the invention, the transformer 211 is a conventional voltage transformer and is utilized to develop a secondary voltage which varies linearly and in direct proportion to line voltage. Accordingly, the voltages appearing across terminals 220 and 221 and across 227 and 228, respectively, will vary inversely to each other in hyperbolic relationship in the same manner as the current input and voltage input of the electric motor driving the apparatus being protected when operated under constant load.

As in the first embodiment, the voltage appearing across terminals 220 and 221 is rectified by the circuit comprising diode 238, filter capacitor 239, and potentiometer 240. Similarly, the voltage at terminals 227 and 228 are rectified by the circuit comprising diode 230, filter capacitor 231, resistor 232 and potentiometer 233.

As a result of the circuits so far described, there is derived a voltage drop across terminal 241 and the sliding contact of potentiometer 240 which is a unidirectional voltage in direct linear proportion to line current and there is derived a voltage drop across terminal 234 and the sliding contact of potentiometer 233 which is in direct linear relationship to line voltage.

Also, as in the previous embodiment, a separate D.-C. power supply is providing for operating unit B consisting of power transformer 245, twin diode 246, filter capacitor 247, resistors 248 and 248', and glow-discharge tubes 249 and 250. The primary 242 is connected to terminals 255 and 254 to which are connected power supply lines 253 and 252, respectively, which power lines may be a conventional 120 or 220 volt supply. A switch 258 is provided to open or close the connection to primary 242, and there is also included a protective fuse 259. A lamp 260 is connected across primary 242 to indicate when the unit is turned on. The power supply circuit above described is connected to a voltage divider, one leg of which comprises resistors 265 and 266 and potentiometer 267, the other leg of which comprises resistor 270 and potentiometers 271 and 272.

As in the previous embodiment, the voltage drop appearing across terminal 241 and the movable contact of 240 is impressed along with a positive voltage taken from potentiometers 271 and 272 on the grid 300 of the triode 301. The voltage drop across terminal 234 and the sliding contact of potentiometer 233 is impressed along with a positive voltage derived at the movable contact of potentiometer 267 as a negative bias on grid 315 of triode 316. The triodes 301 and 316 are operated under a plate voltage of 300 volts, as in the previous embodiment.

The plate 307 of the triode 301 is connected through series resistor 308 to the positive side of the rectified power supply circuit and a resistor 309 is connected in shunt between the plate 307 and the cathode 306. The voltage drop across resistor 308 is applied to the screen grid 297 of the thyratron 290 through current limiting resistor 310.

In the case of triode 316, the plate is connected through resistor 319 to the positive side of the power supply, and there is also provided a shunt resistor 320. Resistor 319 is connected through current limiting resistor 322 to the control grid 298 of the thyratron 290.

The adjustment of potentiometers 240, 271 and 272 and the amount of load provided by resistors 308 and 309 is so selected that the tube 301 is operated in the region where the plate current of tube 301 varies directly or linearly with respect to the voltage developed across potentiometer 240. Therefore, the voltage drop across resistor 308, which is created by the flow of plate current of tube 301, varies directly with the line current of the motor being protected.

The adjustments of potentiometers 233 and 267 and the selection of resistors 319 and 320 is such that the tube 316 is operated in the non-linear portion of its plate current vs. grid voltage curve. The operating region is such that the plate current of tube 316 varies hyperbolically in relation to the voltage across potentiometer 233 in the same manner that the line voltage varies hyperbolically with respect to line current of the motor being protected. Accordingly, the voltage drop across resistor 319, which is developed by the flow of plate current through tube 316, varies hyperbolically with respect to line voltage of the motor being protected.

Upon discharge of the thyratron 290, the solenoid 287 is actuated thus closing the double pole, single throw switch 282. One arm of the switch 282, when moved to closed position, connects one side of the lamp 284 to terminal 254. The other side of lamp 284 is connected through protective fuse 279 to terminal 255. The other arm of switch 282, when moved to the closed position, connects terminal 254 through normally closed push button 281 to terminal 277, which, in turn, is connected to the auxiliary control mechanism C. The auxiliary control mechanism C is also connected through terminal 276 and fuse 279 to terminal 255. It thus will be appreciated that, when the switch 282 is moved to the closed position, which occurs when the thyratron discharges, the lamp 284 and the auxiliary control mechanism C are energized.

The auxiliary control mechanism C may also be actuated, if desired, by an auxiliary switch D which performs the same function as switch 282; namely, to connect terminal 277 to terminal 254.

As in the first embodiment, after the device has been tripped, the cause of the overload can be corrected and then the device can be reset in a simple manner to again protect the apparatus. Resetting of the device is accomplished by a circuit comprising a solenoid 325 and normally open push button 326 which are connected to terminals 254 and 255. The energizing of solenoid 325 by pressing the push button switch 326 causes a switch 336 to close which simultaneously opens the switch 292. The opening of the switch 292, of course, disconnects the thyratron 290 from the solenoid 237 thus interrupting the discharging of the thyratron and permitting the switch 282 to open, thus de-energizing the auxiliary electrical control C. At the same time, the closing of switch 336 places a resistor 327 in parallel with the potentiometer 240, thus increasing the negative bias on screen grid 297 which effectively prevents the thyratron from discharging while normal operations are being resumed. A remote reset switch denoted at E may be connected to terminals 276 and 286 to perform the same function as push button switch 326.

In order to assist in the understanding of the invention the following is an explanation of the mode of operation of the specific embodiments of the present invention. If it is assumed that the motor of the apparatus to be protected is operating under normal load at a given line current and line voltage and that it is desired to energize the protective circuit when the load increases by 10%, the circuits are adjusted so that, at said given line voltage, an increase of 10% in line current will decrease the negative screen grid bias on the thyratron just sufficient to cause the thyratron to trip. Assuming the voltage remains constant, the increase in line current will, of course, be a measure of the increase in load. By the use of the present invention this amount of increase in line current will thereafter always trip the device regardless of line voltage changes. This is explained by the fact that a change in line voltage is accompanied by two counter-balancing functions of the device. Assuming, for simplicity of illustration, that the line voltage varies hyperbolically to cause straight line changes in line current in the reverse direction (performance curve), these straight line changes in current will produce straight line changes in the negative screen grid bias of the thyratron. This follows because a voltage is induced by the "current" transformer which varies in straight line relationship to line current, and this induced voltage is amplified in straight line or linear relationship. At the same time, the hyperbolic changes in line voltage will produce straight line changes in the positive control grid bias of the thyratron. This follows because, in the first embodiment, the transformers utilized for inducing a secondary voltage responsive to line voltage into a secondary voltage change varies hyperbolically with respect to line voltage. In the second embodiment the voltage transformer induces a secondary voltage which varies in straight line relationship to line voltage but this is modified in the amplification stage to develop a voltage which varies hyperbolically with respect to line voltage. By proper adjustment of the magnitude of the changes in screen grid bias of the thyratron as compared with the changes in control grid bias, these changes neutralize each other and the balance of the thyratron remains unaffected. Therefore, the amount of increase in line current above "normal" which is required to trip the device is the same regardless of line voltage. If desired, the same effect could be obtained, of course, by varying the control grid bias linearly with respect to line voltage and then varying the screen grid bias hyperbolically with respect to line current.

To state it another way, the circuits are so adjusted that a change in line voltage which will cause unit changes in current will cause uniform increments or decrements in the voltage across resistors 119 and 319, respectively. Accordingly, the total bias on the control grid of the thyratron will become more positive in uniform increments as the line voltage increases along the hyperbolic performance curve and will become less positive in uniform decrements as the line voltage decreases along such curve. By proper amplification, the amount of said increments or decrements in the positive bias on the control grid of the thyratron may be made proportional to the increment or decrement in the negative bias on the screen grid of the thyratron in accordance with the firing characteristics of the thyratron. In the specific example given previously by way of illustration, the increments or decrements in positive bias on the control grid of the thyratron would have to be four times the amount of the said increments or decrements in the negative bias of the screen grid of the thyratron to keep the conditions on the thyratron in equilibrium. As a result, the thyratron will trip only when the current and voltage inputs to the motor of the apparatus being protected departs from the performance characteristics of that motor; i. e., at a percentage increase in current input above the performance curve for the actual voltage input. In other words, regardless of the actual terminal voltage of the motor (within practical limits) the mechanical load upon the motor must increase just enough to cause the current taken by the motor to be greater by a predetermined amount above the normal current for that voltage in order to cause the thyratron to trip.

In each of the embodiments specifically described above, a negative voltage is applied to the screen grid of the thyratron which is a function of the current in the power lines going to the electric motor to be protected while there is impressed a positive voltage on the control grid of the thyratron which is a function of the voltage on the power lines going to the protected motor. The relationship between the screen grid negative voltage and the current in the power lines, on the one hand, and the relationship between the control grid voltage and the voltage in the power lines, on the other, is such that the thyratron will discharge when the current and voltage in the power lines going to the protected motor depart from the performance curve for the motor. In the first specific embodiment, this has been accomplished in the transformer stage by inducing a voltage which is non-linear with respect to line voltage. In the second embodiment, the same result has been accomplished in the amplification stage by non-linear amplification of a voltage which is responsive to line voltage. It would be equally feasible in either case to utilize a developed voltage which varies linearly throughout with respect to line voltage and a developed voltage varying hyperbolically with respect to line current, the end result being the same in either case.

Thermistor materials or other current, voltage or temperature sensitive materials also may be used to supplement the function of the transformers or amplifying tubes or to impart the desired characteristic thereto. Such materials may be used in numerous ways in the circuits, for example, in the plate or cathode circuits of the amplifier tubes or as the load across the secondaries of the transformers, when used in the plate circuit of the amplifier tubes, for example, a resistor whose resistance increases with current will cause smaller increases in plate voltage as current decreases than would normally be the case, thus creating a non-linear relationship.

For simplicity of presentation, the device of the present invention has been particularly described in connection with a specific embodiment in which is employed a thyratron which will trip when the voltages applied to the grids of the tube deviate from a straight line relationship and in which the tube will continue to discharge once the device has been tripped regardless of further changes in load conditions. Also, it has been assumed that the performance curve of the driving motor of the protected machinery will be a hyperbolic curve, which is the usual case, although conceivable, the efficiency changes in the motor due to changes in line voltage might result in a substantially straight line performance curve.

In the specific embodiment, the thyratron, as explained, is operating under a D. C. voltage, but, if desired, an A. C. voltage could be applied for the same purpose, and, if desired, the switches 82 and 282 and solenoids 87 and 287 could be replaced by a latching type of relay switch. Other methods of combining or interpreting the voltages derived from the triodes as, for example, the substitution of other types of tubes for the thyratron could, of course, be substituted within the skill of one versed in the art and, if desired, the devices could be made to operate so that gradual increase or abrupt increases in load would not cause the device to trip or, if desired, the device could be utilized to energize the auxiliary electrical control if the motor load should fall below a predetermined level.

In the event that the characteristics of the thyratron or other tube substituted therefor are such that the relationship of applied voltages which will maintain equilibrium conditions or "normal" output is hyperbolic instead of straight line, it is of no consequence because in such event the development of the voltages responsive to current and voltage inputs may be modified to suit the characteristics of the tube. It is essential only that the voltages and current inputs to the motor of the protected apparatus which are normal; i. e., in accordance with the performance curve of the motor shall be translated into voltages applied to the thyratron or other final tube which fit the characteristics of such tube.

Other modifications in the circuits of the device of the present invention also will be obvious to one skilled in the art. For example, in the preferred embodiment, the voltages derived across potentiometers 40 and 33 or 240 and 233 are substantially non-fluctuating unidirectional voltages because of the filter capacitors 39 and 31 and 239 and 231, respectively. However, the circuit would function satisfactorily in the absence of such filtering, or by a lesser degree of filtering, etc.

Also, in some cases, multi-tube amplification in place of the single tube amplifier circuits may be found to be preferable. As will be apparent, the sensitivity of the device can be readily increased to any desired extent merely by increasing the amount of amplification.

Also, for simplicity of presentation, the device has been particularly described for use with a motor or other means operating on a single phase power supply. As will be readily understood, in the event of a polyphase power supply, increased accuracy would be obtained by providing a "current" transformer in, and a voltage transformer across, each of the phases.

It thus will be seen that there has been provided, in accordance with the invention, a protective device which fully and accurately takes into account the changes in line voltage and line current of a device to be protected so that actuation of the protective mechanism very closely follows the actual load conditions on the device. The apparatus is fully automatic in operation and will serve accurately over long periods of time without repair or replacement. The apparatus is adaptable to many different types of commercial installations and will provide a critical and uniform type of operation which is required for full protection of motors and apparatuses driven thereby from damage caused by improper load conditions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A protective device for use with electrically operated means having a current input which increases hyperbolically with respect to decreases in voltage input under normal load comprising, in combination, means for developing a voltage component having a linear relationship to one of said inputs, means for developing a second voltage component opposed to said first voltage component which second voltage component varies hyperbolically with respect to the other of said inputs and whereby said hyperbolic relationship of said inputs is translated into a linear relationship of said voltage components, and means responsive to said voltage components for energizing a protective circuit when said voltage components depart from said last-named linear relationship.

2. A protective device for use with electrically operated means having a current input and a voltage input which vary inversely to each other along a hyperbolic curve under normal load comprising, in combination, means for developing a first voltage component increasing linearly in a positive direction with respect to increases in one of said inputs, means for developing a second voltage component opposed to the first voltage component which increases linearly in a positive direction with respect to increases along said hyperbolic curve in the other of said inputs, and means responsive to said voltage components for energizing a protective circuit when changes in said voltage components depart from a linear relationship corresponding to the inverse hyperbolic relationship of current and voltage inputs under normal load.

3. A protective device for use with electrically operated means having a current input and a voltage input which vary inversely to each other along a predetermined hyperbolic curve under normal load comprising, in combination, a protective circuit, means for energizing said circuit comprising a gas filled tube having a pair of elements for receiving a plurality of opposed voltages and constructed and arranged to discharge when an increment in one of said opposed voltages in a positive direction exceeds a compensating decrement in a positive direction of the other of said opposed voltages, means operatively connected to one element of the tube for developing said one of the opposed voltages in linear relationship to one of said inputs, and means operatively connected to the other element of the tube for developing the other of said opposed voltages in hyperbolic relationship to the other of said inputs.

4. A protective device for use with electrically operated means having a current input and a voltage input which vary inversely to each other along a predetermined hyperbolic curve under normal load comprising, in combination, a protective circuit, means for energizing said circuit comprising a gas filled tube having a pair of elements for receiving a plurality of opposed voltages and constructed and arranged to discharge when an increment in one of said opposed voltages in a positive direction exceeds a compensating decrement in a positive direction of the other of said opposed voltages, means operatively connected to one element of the tube for developing one of said opposed voltages and for varying said voltage in a positive direction in increments having a linear relationship to increases in one of said inputs, and means operatively connected to the other element of the tube for developing the other of said opposed voltages and varying same in a positive direction in said compensating decrements when the other of said inputs varies inversely in hyperbolic relationship to said increases in said one of the inputs.

5. A protective device for use with electrically operated means having a current and a voltage input comprising, in combination, a protective circuit, means for energizing said circuit comprising a gas filled tube having a pair of elements for receiving a plurality of opposed voltages and constructed and arranged to discharge when an increment in one of said opposed voltages in a positive direction exceeds a compensating decrement in a positive direction of the other of said opposed voltages, means operatively connected to one element of the tube for developing one of said opposed voltages and for varying said voltage in a positive direction in increments having a linear relationship to increases in one of said inputs, and means operatively connected to the other element of the tube for developing the other of said voltages and for varying same in a positive direction in decrements having a hyperbolic relationship to decreases in the other of said inputs, the amount of said decrements being sufficient to compensate for said increments when one of the inputs varies approximately inversely with respect to the other of said inputs.

6. A protective device for use with an electrically operated means having a current input varying in a predetermined hyperbolic relationship with its voltage input under constant load comprising, in combination, first means for developing a direct current voltage linearly proportional to one of said inputs, second means for developing an opposed direct current voltage varying in said predetermined hyperbolic relationship with respect to the other of said inputs, a thyratron having elements operatively connected to said first and second means, respectively, and adapted to discharge when said direct current voltages depart from a predetermined linear relationship, and a protective circuit energized by the discharge of the thyratron.

7. A protective device for use with an electric motor having a voltage input varying inversely in a predetermined hyperbolic relationship to the current input under normal load comprising a first circuit for deriving a negative voltage component having a linear relationship to the current input to the motor, said negative voltage component becoming less negative as the current increases, a second circuit for deriving a positive voltage component varying in said predetermined hyperbolic relationship to the voltage input, said positive voltage component becoming more positive as the voltage increases, and a circuit including a tube having elements operatively connected to said first and second circuits, respectively, and responsive to said voltage components for protecting the motor when the changes in said voltage inputs depart from a linear relationship indicating said variations in voltage and current inputs under normal load.

8. A protective device for use with electrically operated means having a voltage and a current input and adapted to be used in combination with the power supply lines of said means comprising, in combination, a protective circuit including a thyratron having a control grid and a screen grid, said thyratron being adapted to discharge when a negative voltage on the screen grid and a positive voltage on the control grid depart from a predetermined linear relationship, a circuit for connection to said lines and connected to said screen grid for impressing a negative voltage on said screen grid having a linear relationship to one of said inputs, and a second circuit for connection to said lines and connected to said control grid for impressing a positive voltage on said control grid having a hyperbolic relationship to the other of said inputs.

9. A protective device for use with electrically operated means having a current input and a voltage input which vary inversely to each other along a hyperbolic curve under normal load comprising, in combination, first transformer means for developing a secondary voltage increasing linearly in a positive direction with respect to increases in one of said inputs, second transformer means for developing a secondary voltage which increases linearly in a positive direction with respect to increases along said hyperbolic curve in the other of said inputs, and means responsive to said secondary voltages for energizing a protective circuit when changes in said secondary voltages depart from a linear relationship corresponding to the inverse hyperbolic relationship of current and voltage inputs under normal load.

10. A protective device for connection to the power lines of electrically operated means having a current input which varies inversely to voltage input in accordance with a predetermined hyperbolic curve under constant load comprising, in combination, transformer means for inducing a secondary voltage increasing linearly in a positive direction with respect to increases in one of said inputs, second transformer means for inducing a secondary voltage which increases linearly in a positive direction with respect to increases along said hyperbolic curve in the other of said inputs, means for developing opposed voltages which vary linearly in a positive direction responsive to said secondary voltages, and means responsive to said opposed voltages for energizing a protective circuit when changes in said opposed voltages depart from a linear relationship corresponding to the inverse hyperbolic relationship of said current and voltage inputs under normal load.

11. A protective device for connection to the power lines of operated means having a current input and a voltage input which vary inversely to each other along a predetermined hyperbolic curve under normal load conditions comprising, in combination, a protective circuit, means for energizing said circuit comprising a tube having elements for receiving two opposed voltages and constructed and arranged to discharge when an increment in one of said opposed voltages in a positive direction exceeds a compensating decrement in a positive direction of the other of said opposed voltages, first means including a transformer for connection in one of said power lines for developing one of said opposed voltages in linear relationship to said current input, second means including a transformer for connection across the power lines for developing the other of said opposed voltages in hyperbolic relationship to said voltage input, and means operatively connecting the first and second means to the tube elements.

12. A protective device for connection to the power lines of electrically operated means drawing a line current which varies in hyperbolic relationship to the line voltage under constant load comprising, in combination, a step-up transformer and a step-down transformer having primaries for connection in series across the power lines and with their secondaries connected in opposition for developing a combined secondary voltage which varies hyperbolically in relationship to line voltage, a third transformer having a primary for carrying the line current and a secondary for developing a secondary voltage varying in direct linear relationship to line current, a tube having elements for receiving two applied voltages and constructed and arranged to discharge when said applied voltages depart from a predetermined linear relationship, means for amplifying and applying said secondary voltages to the elements of the tube and a protective circuit for the electrically operated means including said tube and constructed and arranged to function upon discharge of the tube.

13. A protective device for connection to the power lines of electrically operated means drawing a line current which varies in hyperbolic relationship to line voltage under constant load comprising, in combination, a protective circuit for said means, means for energizing said circuit comprising a tube having elements for receiving two opposed voltages and constructed and arranged to discharge when an increment in one of said opposed voltages in a positive direction exceeds a compensating decrement in a positive direction of the other of said opposed voltages, first means for developing one of said opposed voltages in linear relationship to line current including a transformer having a primary for carrying line current and a secondary for developing a secondary voltage in linear relationship to said line current, second means for developing the other of said opposed voltages in hyperbolic relationship to said line voltage, said last named means including a step-up transformer and a step-down transformer having primaries for connection in series across the power lines and with their secondaries connected in opposition for developing a combined secondary voltage which varies hyperbolically in relationship to line voltage, and means operatively connecting the said first and second means to the tube elements.

14. A protective device for use with electrically operated means and adapted to be used in combination with the power supply lines of said means comprising, in combination, a first circuit adapted to be connected in one of said lines for deriving a first D. C. voltage component having a linear relationship to the current in said lines, a second circuit adapted to be connected to said lines for deriving a second D. C. voltage component having a linear relationship to the voltage across said lines, a protective circuit for said means including a thyratron having a control grid and a screen grid adapted to be energized when a negative voltage on the screen grid and a positive voltage on the control grid depart from a predetermined linear relationship, a circuit operatively connected to the screen grid and including a triode having an element operatively connected to one of said first and second circuits and responsive to the D. C. voltage component derived thereby for impressing a negative voltage on said screen grid having a linear relationship to said voltage component, and a circuit operatively connected to the screen grid and including a triode having an element operatively connected to the other of said first and second circuits and responsive to the voltage component derived thereby for impressing a positive voltage on said control grid having a hyperbolic relationship to said other D. C. voltage component.

15. A protective device for use with electrically operated means and adapted to be used in combination with the power supply lines of said means comprising, in combination, a first circuit including a transformer adapted to be connected in one of said lines and a rectifier for obtaining a negative D. C. voltage component having a linear relationship to the current in said lines, a second circuit including a transformer adapted to be connected across said lines and a rectifier for obtaining a negative D. C. voltage component having a linear relationship to the voltage across said lines, a protective circuit for said means including a thyratron having a control grid and a screen grid adapted to be energized when a negative voltage on the screen grid and a positive voltage on the control grid depart from a predetermined linear relationship, and circuits operatively connected to said grids and having means for impressing a negative voltage on said screen grid and a positive voltage on said control grid which vary in said predetermined linear relationship when the current in said lines varies substantially inversely in hyperbolic relationship with voltage changes across said lines, said last named means being operatively connected to the outputs of said first and second circuits.

16. A protective device for use with electrically operated means and adapted to be used in combination with the power supply lines of said means comprising, in combination, a first circuit including a transformer adapted to be connected in one of said lines and a rectifier for obtaining a negative D. C. voltage component having a linear relationship to the current in said lines, a second circuit including a transformer adapted to be connected across said lines and a rectifier for obtaining a negative D. C. voltage component having a linear relationship to the voltage across said lines, a protective circuit for said means including a thyratron having a control grid and a screen grip adapted to be energized when a negative voltage on the screen grid and a positive voltage on the control grid depart from a predetermined linear relationship, a circuit operatively connected to the said screen grid and having means operatively connected to the said first circuit for impressing a negative voltage on said screen grid varying linearly in an opposite direction proportionately to changes in the first named D. C. voltage component, and a circuit operatively connected to the said control grid and having means operatively connected to the said second circuit for impressing a positive voltage on said control grid varying hyperbolically in relationship to the second named D. C. voltage component whereby said grid voltages will vary in said predetermined linear relationship when the line current varies substantially inversely in hyperbolic relationship to changes in line voltage.

17. A protective device for use with electrically operated means and adapted to be used in combination with the power supply lines of said means comprising, in combination, a first circuit including a transformer adapted to be connected in one of said lines and a rectifier for obtaining a negative D. C. voltage component having a linear relationship to the current in said lines, a second circuit including a transformer adapted to be connected across said lines and a rectifier for obtaining a negative D. C. voltage component having a linear relationship to the current in said lines, a second circuit including a transformer adapted to be connected across said lines and a rectifier for obtaining a negative D. C. voltage component having a linear relationship to the voltage across said lines, a protective circuit for said means including a thyratron having a control grid and a screen grid adapted to be energized when a negative voltage on the screen grid and a positive voltage on the control grid depart from a predetermined linear relationship, a third circuit operatively connected to the first circuit and the screen grid having means responsive to the first named D. C. voltage component for impressing a negative voltage on said screen grid varying linearly in an opposite direction to changes in said component, a fourth circuit operatively connected to the second circuit and the control grid having means responsive to the second named D. C. voltage component for impressing a positive voltage on said control grid varying hyperbolically in relationship to changes in said component, and means for adjusting the output of said circuits for predetermining the value of said grid voltages such that the grid voltages will vary in said predetermined linear relationship when the line current varies substantially inversely with changes in line voltage.

18. In a protective device for use with an electric motor and adapted to be connected to the power supply lines of said motor, the combination comprising a first circuit for developing a D. C. voltage variable in proportion to changes in line voltage, a second circuit for developing a D. C. voltage variable in proportion to changes in line current, discharge means having a plurality of elements and adapted to function when the impressed voltage on said elements departs from a predetermined linear relationship, a circuit operatively connected to the first circuit and one of said elements for developing one of said impressed voltages including a triode having a grid bias responsive to one of said developed D. C. voltages and having a predetermined plate load resulting in a linear relationship between the impressed voltage and said developed voltage, and a circuit operatively connected to the second circuit and the other of said elements for developing the other of said impressed voltages including a triode having a grid bias responsive to the other of said developed D. C. voltages and having a predetermined plate load such that the other of said impressed voltages will vary hyperbolically with respect to said other developed D. C. voltage.

19. A protective device for use with electrically operated means and adapted to be used in combination with the power supply lines of said means comprising, in combination, a first circuit comprising a transformer adapted to be connected in one of said lines, a rectifier, and a potentiometer for developing a first adjustable negative voltage proportional to line current, a second circuit comprising a transformer adapted to be connected across said lines, a rectifier, and a potentiometer for developing a second adjustable negative voltage proportional to line voltage, a protective circuit for said means including a thyratron having a control grid and a screen grid and adapted to discharge when a predetermined positive voltage impressed on said control grid exceeds a predetermined negative voltage impressed on said screen grid and when increments in a positive direction in one of said impressed voltages exceeds a proportionately related decrement in a positive direction in the other of said impressed voltages, an amplifying circuit operatively connected to the first circuit and the screen grid for impressing a negative voltage on said screen grid which varies linearly with respect to line current including a triode having a grid responsive to said first adjustable negative voltage, a second amplifying circuit operatively connected to the second circuit and the control grid for impressing a positive voltage on said control grid which varies hyperbolically with respect to line voltage such that changes in line voltage which will cause unit changes in line current will cause uniform changes in the same direction in the impressed control grid voltage sufficient to balance changes in the screen grid voltage caused by such changes in line voltage including a triode having a grid responsive to said second adjustable negative voltage, and an adjustable source of a positive voltage bias connected to the grids of said triodes whereby the said predetermined voltages on said thyratron grids may be present by adjustment of said source and by adjustment of said potentiometers to correspond to a predetermined line voltage and current.

EVERETT C. BRILL.

REFERENCES CITED

The following references are of record in the file of this patent:

UNITED STATES PATENTS

| Number | Name | Date |
|---|---|---|
| 1,669,154 | Baker | May 8, 1928 |